(12) United States Patent
Kera

(10) Patent No.: US 8,797,438 B2
(45) Date of Patent: Aug. 5, 2014

(54) DIGITAL CAMERA AND PIXEL ADDING METHOD OF SAME

(75) Inventor: Hideaki Kera, Koshigaya (JP)

(73) Assignee: Nikon Corporation, Tokyo (JP)

( * ) Notice: Subject to any disclaimer, the term of this patent is extended or adjusted under 35 U.S.C. 154(b) by 39 days.

(21) Appl. No.: 12/691,276

(22) Filed: Jan. 21, 2010

(65) Prior Publication Data

US 2010/0208124 A1 Aug. 19, 2010

(30) Foreign Application Priority Data

Feb. 16, 2009 (JP) ................................. 2009-032302

(51) Int. Cl.
*H04N 9/083* (2006.01)
*H04N 3/14* (2006.01)
*H04N 5/335* (2011.01)
*H04N 9/04* (2006.01)

(52) U.S. Cl.
USPC ......................................... 348/305; 348/273

(58) Field of Classification Search
None
See application file for complete search history.

(56) References Cited

U.S. PATENT DOCUMENTS

| 6,366,318 | B1 | 4/2002 | Smith et al. | |
|---|---|---|---|---|
| 7,242,432 | B2 * | 7/2007 | Watanabe | 348/333.11 |
| 7,688,364 | B2 * | 3/2010 | LeGall et al. | 348/240.99 |
| 2001/0010554 | A1 * | 8/2001 | Yoshida | 348/312 |
| 2005/0140806 | A1 * | 6/2005 | Nam | 348/311 |
| 2008/0088725 | A1 | 4/2008 | Matsunaga | |
| 2010/0053356 | A1 * | 3/2010 | Tsunekawa et al. | 348/222.1 |
| 2010/0141812 | A1 | 6/2010 | Hirota | |

FOREIGN PATENT DOCUMENTS

| JP | A-2000-261814 | 9/2000 |
|---|---|---|
| JP | A-2008-98971 | 4/2008 |
| JP | A-2010-136225 | 6/2010 |

OTHER PUBLICATIONS

Jun. 4, 2013 Office Action issued in Japanese Patent Application No. 2009-032302 (with translation).
Apr. 1, 2014 Office Action issued in Japanese Patent Application No. 2009-032302 (with translation).

* cited by examiner

*Primary Examiner* — Albert Cutler
(74) *Attorney, Agent, or Firm* — Oliff PLC

(57) ABSTRACT

In an imaging apparatus adding image signals output from a sensor array which receives a light flux through an optical system and performs photoelectric conversion thereon, the sensor array being arranged a plurality of light receiving elements two-dimensionally, the imaging apparatus includes a pixel adding unit that divides the light receiving elements on the sensor array into a plurality of groups with a region including predetermined types of pixels as a group unit, and that adds, for each of the types of pixels, image signals output from the pixels included in four of the groups which are positioned "n" groups away from each other on the sensor array.

4 Claims, 6 Drawing Sheets

FIG.4A

| R11 | Gr12 | R13 | Gr14 | R15 | Gr16 | R17 | Gr18 |
|-----|------|-----|------|-----|------|-----|------|
| Gb21| B22  | Gb23| B24  | Gb25| B26  | Gb27| B28  |
| R31 | Gr32 | R33 | Gr34 | R35 | Gr36 | R37 | Gr38 |
| Gb41| B42  | Gb43| B44  | Gb45| B46  | Gb47| B48  |
| R51 | Gr52 | R53 | Gr54 | R55 | Gr56 | R57 | Gr58 |
| Gb61| B62  | Gb63| B64  | Gb65| B66  | Gb67| B68  |
| R71 | Gr72 | R73 | Gr74 | R75 | Gr76 | R77 | Gr78 |
| Gb81| B82  | Gb83| B84  | Gb85| B86  | Gb87| B88  |

FIG.4B

| R11' | Gr12' | R13' | Gr14' |
|------|-------|------|-------|
| Gb21'| B22'  | Gb23'| B24'  |
| R31' | Gr32' | R33' | Gr34' |
| Gb41'| B42'  | Gb43'| B44'  |

FIG.5A

| R11 | Gr12 | R13 | Gr14 | R15 | Gr16 | R17 | Gr18 |
|-----|------|-----|------|-----|------|-----|------|
| Gb21| B22  | Gb23| B24  | Gb25| B26  | Gb27| B28  |
| R31 | Gr32 | R33 | Gr34 | R35 | Gr36 | R37 | Gr38 |
| Gb41| B42  | Gb43| B44  | Gb45| B46  | Gb47| B48  |
| R51 | Gr52 | R53 | Gr54 | R55 | Gr56 | R57 | Gr58 |
| Gb61| B62  | Gb63| B64  | Gb65| B66  | Gb67| B68  |
| R71 | Gr72 | R73 | Gr74 | R75 | Gr76 | R77 | Gr78 |
| Gb81| B82  | Gb83| B84  | Gb85| B86  | Gb87| B88  |

FIG.5B

| R11' | Gr12' | R13' | Gr14' |
|------|-------|------|-------|
| Gb21'| B22'  | Gb23'| B24'  |
| R31' | Gr32' | R33' | Gr34' |
| Gb41'| B42'  | Gb43'| B44'  |

DIGITAL CAMERA AND PIXEL ADDING METHOD OF SAME

CROSS REFERENCE TO THE RELATED APPLICATIONS

This application is based upon and claims the benefit of priority from Japanese Patent Application No. 2009-032302, filed on Feb. 16, 2009, the entire contents of which are incorporated herein by reference.

BACKGROUND

1. Field

The present embodiment relates to an imaging apparatus including a primary filter and a pixel adding method thereof.

2. Description of the Related Art

In recent years, digital still cameras have been widely used that have the function of preventing the occurrence of camera shake by performing, at the time of shooting in a dark place, pixel addition in an image sensor to increase shooting sensitivity and thus a shutter speed. Digital video cameras have also been widely used that perform pixel addition in an image sensor to allow high-quality moving images to be taken at a high frame rate.

However, when the pixel addition (pixel mixing) is performed, a Nyquist frequency is lowered, with the result that moire (folding noise caused by a frequency component higher than the Nyquist frequency) is produced in the taken image.

In order to reduce the moire produced by the pixel addition, for example, in Japanese Unexamined Patent Application Publication No. 2008-98971, there is disclosed a method of performing pixel addition so that the centers of gravity of pixel groups of R, G, and B after the addition are evenly arranged without being unevenly distributed in the pixel region of an image sensor.

However, since a method of performing addition on the adjacent pixels of the same color is conventionally used, moire is still produced in a taken image, and there is room for improvements.

SUMMARY

The present embodiment aims at solving the conventional problem described above. A proposition of the present embodiment is to provide an imaging apparatus that can reduce moire produced by pixel addition and a pixel adding method thereof.

According to one aspect, there provided an imaging apparatus adding image signals output from a sensor array that receives a light flux through an optical system and performs photoelectric conversion thereon, the sensor array being arranged a plurality of light receiving elements two-dimensionally, the imaging apparatus includes a pixel adding unit that divides the light receiving elements on the sensor array into a plurality of groups with a region including predetermined types of pixels as a group unit, and that adds, for each of the types of pixels, image signals output from the pixels included in four of the groups which are positioned "n" groups away from each other on the sensor array.

In the imaging apparatus according to the one aspect, the number of the "n" groups that determines a distance between the groups to be added is one.

In the imaging apparatus according to the one aspect, the types of pixels are four types which are a red (R) pixel, a first green (Gr) pixel, a second green (Gb) pixel, and a blue (B) pixel, the four types being determined by a Bayer arrangement which is a method of arranging primary filters.

According to another aspect, there provided a pixel adding method adding image signals output from a sensor array that receives a light flux through an optical system and performs photoelectric conversion thereon, the sensor array being arranged a plurality of light receiving elements two-dimensionally, the pixel adding method includes the steps of dividing the light receiving elements on the sensor array into a plurality of groups with a region including predetermined types of pixels as a group unit, and adding, for each of the types of pixels, image signals output from the pixels included in four of the groups which are positioned "n" groups away from each other on the sensor array.

In the pixel adding method according to the aspect, the number of the "n" groups that determines a distance between the groups to be added is one.

In the pixel adding method according to the aspect, the types of pixels are four types which are a red (R) pixel, a first green (Gr) pixel, a second green (Gb) pixel, and a blue (B) pixel, the four types being determined by a Bayer arrangement which is a method of arranging primary filters.

DESCRIPTION OF THE DRAWINGS

Other propositions, features and benefits of the present embodiment described above will become more apparent from the following description.

FIG. 4A shows pixel addition processing performed by a pixel adding section 111.

FIG. 4B shows the pixel addition processing performed by the pixel adding section 111.

FIG. 5A shows the pixel addition processing performed by the pixel adding section 111.

FIG. 5B shows the pixel addition processing performed by the pixel adding section 111.

FIG. 6A shows the pixel addition processing performed by the pixel adding section 111.

FIG. 6B shows the pixel addition processing performed by the pixel adding section 111.

FIG. 7A shows the pixel addition processing performed by the pixel adding section 111.

FIG. 7B shows the pixel addition processing performed by the pixel adding section 111.

FIG. 8 shows a case where the pixel addition is performed within the solid-state image sensor 103.

DETAILED DESCRIPTION OF THE EMBODIMENTS

The present embodiment will be described below. The present embodiment is an embodiment of a digital camera.

Figure 1:
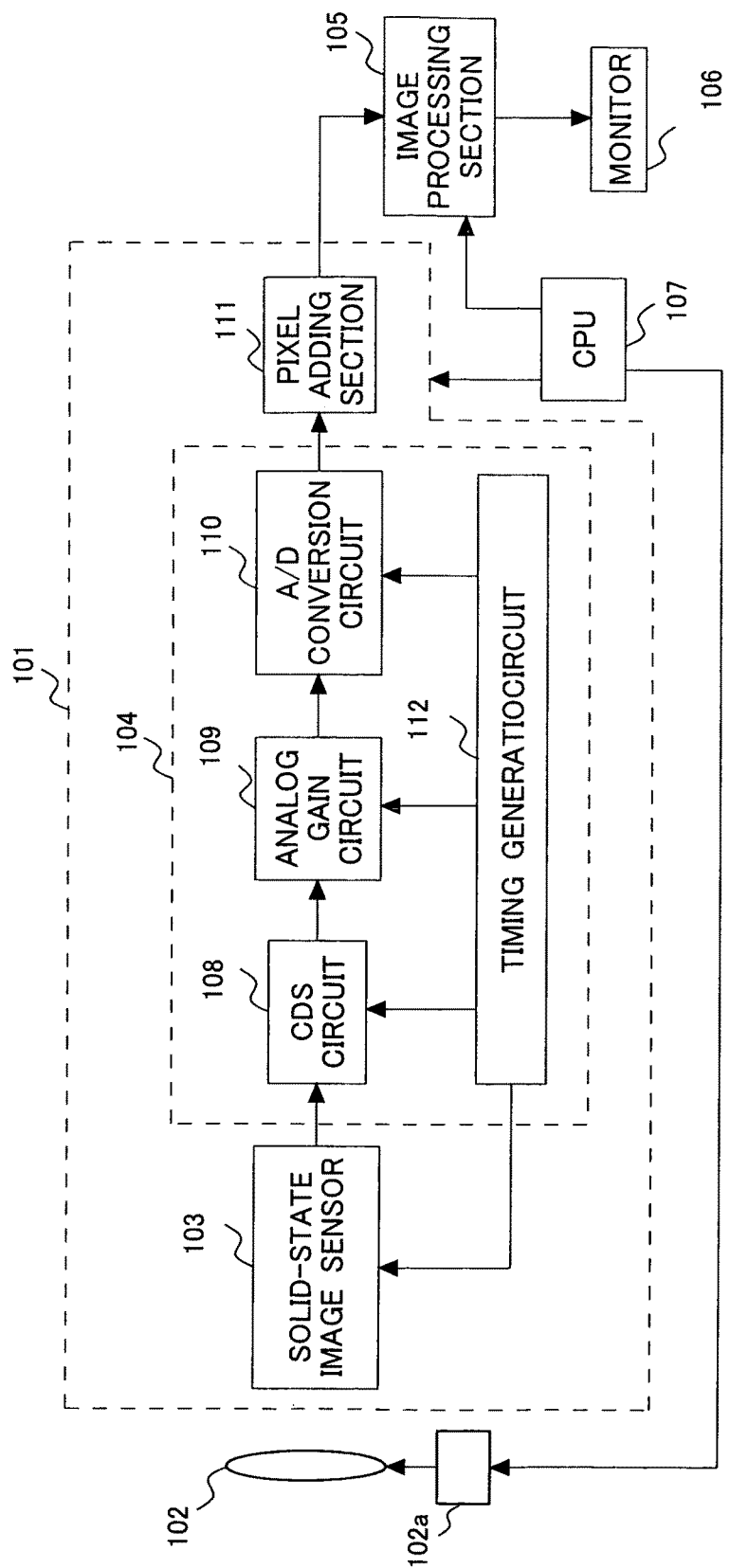
FIG. 1 shows the configuration of a digital camera of the present embodiment.

FIG. 1 shows the configuration of the digital camera of the present embodiment.

The digital camera includes a solid-state imaging apparatus 101, an imaging lens 102, a lens driving section 102a, an image processing section 105, a monitor 106, and a CPU 107 for collectively controlling the digital camera. Here, the solid-state imaging apparatus 101 includes a solid-state image sensor 103, an analog front end (AFE) 104, and a pixel adding section 111. The AFE 104 has a CDS (correlated double sampling) circuit 108, an analog gain circuit 109, an A/D conversion circuit 110, and a timing generation circuit 112.

The imaging lens 102 has a plurality of lens groups including a focus lens and a zoom lens. For simplicity, in FIG. 1, the imaging lens 102 is shown as a single lens.

The lens driving section 102a generates a lens drive signal according to an instruction of the CPU 107 and moves the imaging lens 102 in the direction of an optical axis and performs focus adjustment and zoom adjustment, and forms a subject image generated by a light flux that has passed through the imaging lens 102 on the light receiving surface of the solid-state image sensor 103.

The solid-state image sensor 103 is a CCD or CMOS area image sensor, and is arranged on the side of an image space of the imaging lens 102. The solid-state image sensor 103 photoelectrically converts the subject image formed on the light receiving surface and generates an analog image signal.

On the light receiving surface of the solid-state image sensor 103, a plurality of photodiodes (light receiving elements) is two-dimensionally arranged. Moreover, in order to take a color photograph of the subject, on the light receiving surface, the primary filters of red (R), green (G), and blue (B) corresponding to the individual photodiodes are arranged in a predetermined arrangement such as the Bayer arrangement. Hence, the analog image signals output by the solid-state image sensor 103 include R, G, B color signal components. On the entire light receiving surface of the solid-state image sensor 103, an optical low pass filter, an infrared cut filter, and the like are provided.

The CDS (correlated double sampling) circuit 108 samples both the analog image signal, at the time of reset (before light exposure), that is generated by the solid-state image sensor 103 and the analog image signal at the time of data transfer (after light exposure), and subtracts the value of the signal at the time of reset from the value of the signal at the time of data transfer, and thus noise caused by a dark current is removed from the analog image signal.

The analog gain circuit 109 sets the gain adjustment amount of the analog image signal based on an instruction of the CPU 107. Thus, an ISO sensitivity-equivalent shooting sensitivity adjustment is performed on the analog image signal that is output by the CDS circuit 108 after the noise removal.

The A/D conversion circuit 110 converts the analog image signal output by the analog gain circuit 109 into digital data (image data), and outputs it to the pixel adding section 111.

The timing generation circuit 112 supplies, based on an instruction of the CPU 107, timing pulses to the individual portions of the solid-state imaging apparatus 101. Timing for driving the solid-state image sensor 103, the CDS circuit 108, the analog gain circuit 109, and the A/D conversion circuit 110 is controlled by those timing pulses. For example, in the solid-state image sensor 103, timing for reading a charge from the photodiode on the light receiving surface, and the like are controlled, and, in the CDS circuit 107, timing for sampling the analog image signal generated by the solid-state image sensor 103 and the like are controlled.

The pixel adding section 111 performs pixel addition processing according to an instruction of the CPU 107 and based on the image data output by the A/D conversion circuit 110, and outputs the image data generated by the processing as an output of the solid-state imaging apparatus 101. The pixel addition processing performed by the pixel adding section 111 will be described in detail later.

The image processing section 105 performs, according to an instruction of the CPU 107, image processing, such as white balance adjustment, color separation (interpolation), contour enhancement, and gamma correction, on the image data output by the solid-state imaging apparatus 101. The image processing section 105 is included as an ASIC or the like.

The monitor 106 is an LCD monitor provided such as behind the back of the enclosure of the digital camera, an electronic finder with an eyepiece portion or the like; the monitor 106 displays various images according to an instruction of the CPU 107.

Figure 2:
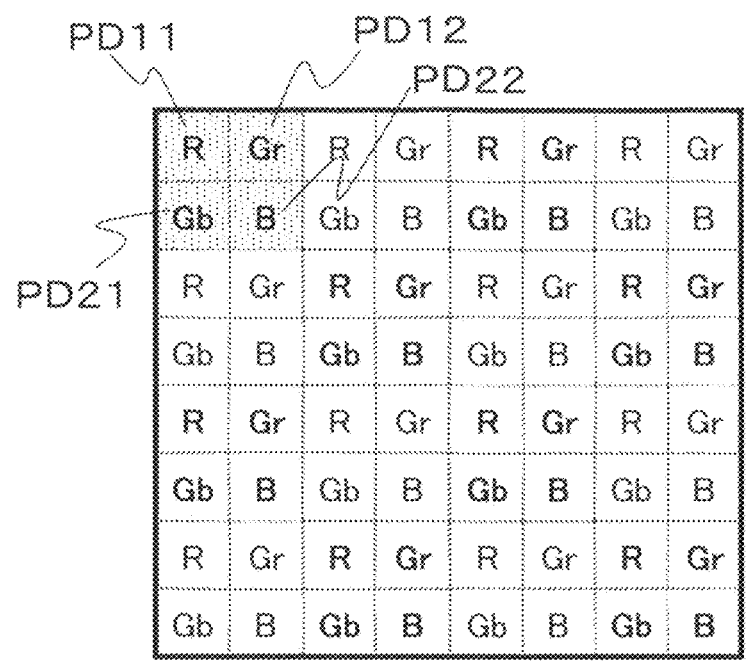
FIG. 2 shows a method of arranging primary filters of a solid-state image sensor 103.

A method of arranging the primary filters on the light receiving surface of the solid-state image sensor 103 will now be described with reference to FIG. 2.

In each of the photodiodes PD on the light receiving surface of the solid-state image sensor 103, for example, the primary filters of red (R), green (G), and blue (B) are arranged in the Bayer arrangement. Specifically, the primary filters are arranged such that an arrangement pattern "R, Gr, Gb, and B" where red (R) is for PD11, green (Gr) for PD12, green (Gb) for PD21, and blue (B) for PD22 is repeated. Although the filter of green (G) is disposed in both the PD12 and the PD 21, the PD12 is represented by "Gr" and the PD21 is represented by "Gb", as represented above, so that the photodiodes where those filters are disposed are distinguished.

In this way, the types of pixels of the photodiodes on the light receiving surface are determined by the method of arranging the primary filters. For example, in the Bayer arrangement, the four types, namely, R (red color), Gr (first green color), Gb (second green color), and B (blue color), are determined.

The pixel adding section 111 of the solid-state imaging apparatus 101 performs the pixel addition processing for each group with the four types of pixels as a unit.

Figure 3:
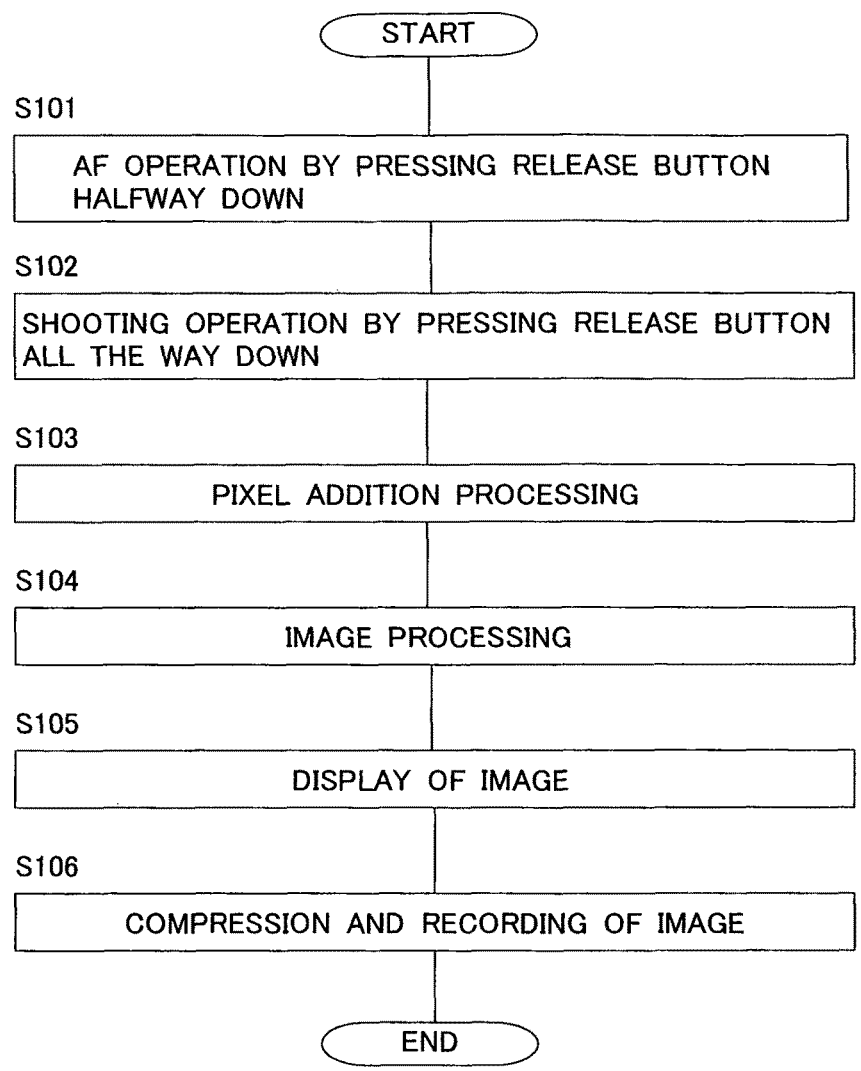
FIG. 3 shows the operation of pixel addition of the digital camera.

The operation of the pixel addition performed by the digital camera of the present embodiment will be described below with reference to a flowchart shown in FIG. 3. The operation shown in the flowchart of FIG. 3 is performed when a user presses down a release button to start the shooting of the digital camera.

In step 101, when the user presses the release button halfway down, the CPU 107 performs, before the shooting, focus adjustment control (AF) on the imaging lens 102 together with the lens driving section 102a.

In step 102, when the user presses the release button all the way down, the CPU 107 determines, based on an evaluation value calculated by a unillustrated photometry section, shooting conditions (such as an aperture value, a shutter speed, and whether or not to use electronic flash).

Then, the CPU 107 drives, under the determined shooting conditions, the lens driving section 102a, the AFE 104, and the timing generation circuit 112 and performs shooting. Here, the analogue image signal generated by the solid-state image sensor 103 is converted into digital data (image data) through the CDS circuit 108 of the AFE 104, the analog gain circuit 109, and the A/D conversion circuit 110, and the digital data is output to the pixel adding section 111.

In step 103, the CPU 107 drives the pixel adding section 111 and performs the pixel addition processing.

The pixel addition processing performed by the pixel adding section 111 will now be described with reference to FIGS. 4A, 4B, 5A, 5B, 6A, 6B, 7A, and 7B.

In the following description, as shown in FIG. 4A, the pixel adding section 111 is assumed to perform the pixel addition based on image data made up of a total of 64 pixels, 8 pixels vertically by 8 pixels horizontally. This is just an example, and the configuration of the pixels is not limited to this.

The pixels within the image data correspond to the photodiodes (light receiving elements) arranged on the light receiving surface of the solid-state image sensor 103 in a one-to-one manner.

With respect to groups in units of four types of pixels R, Gr, Gb, and B, the pixel adding section 111 adds, for each type of pixels, the image signals of pixels of four groups which are positioned alternately within the image data, that is, which are positioned one group away from each other on the sensor array (the light receiving surface of the solid-state image sensor 103) where the light receiving elements are two-dimensionally arranged, and thereby generates image signals obtained by the four-pixel addition.

The pixel adding section 111 first takes the group "R11, Gr12, Gb21, and B22" shown in FIG. 4A as a base point for the pixel addition.

In this case, the groups that are positioned alternately are the three groups, the group "R15, Gr16, Gb25, and B26" that is located in a horizontal direction, the group "R51, Gr52, Gb61, and B62" that is located in a vertical direction, and the group "R55, Gr56, Gb65, and B66" that is located in an oblique direction.

Hence, the pixel adding section 111 adds, for each type of pixels, the image signals of the pixels of the four groups made up of those three groups and the base point group, and thereby generates image signals obtained by the four-pixel addition.

Specifically, the pixel adding section 111 adds the image signals of the four pixels made up of "R11" in the base point group, "R15" in the group in the horizontal direction, "R51" in the group in the vertical direction, and "R55" in the group in the oblique direction, and thereby generates the image signal of a pixel "R11'" within image data shown in FIG. 4B, that is, image data generated by the pixel addition. The image data generated by the pixel addition and shown in FIG. 4B is stored, in an unillustrated memory, in a region different from the region where the image data used as the base data for the pixel addition and shown in FIG. 4A are stored.

The pixel adding section 111 also adds the image signals of the four pixels made up of "Gr12" in the base point group, "Gr16" in the group in the horizontal direction, "Gr52" in the group in the vertical direction, and "Gr56" in the group in the oblique direction, and thereby generates the image signal of a pixel "Gr12'" within image data shown in FIG. 4B.

The pixel adding section 111 also adds the image signals of the four pixels made up of "Gb21" in the base point group, "Gb25" in the group in the horizontal direction, "Gb61" in the group in the vertical direction, and "Gb65" in the group in the oblique direction, and thereby generates the image signal of a pixel "Gb21'" within image data shown in FIG. 4B.

The pixel adding section 111 also adds the image signals of the four pixels made up of "B22" in the base point group, "B26" in the group in the horizontal direction, "B62" in the group in the vertical direction, and "B66" in the group in the oblique direction, and thereby generates the image signal of a pixel "B22'" within image data shown in FIG. 4B.

Then, the pixel adding section 111 takes the group "R13, Gr14, Gb23, and B24" shown in FIG. 5A as a base point for the pixel addition. Then, the pixel adding section 111 adds, for each type of pixels, the image signals of the pixels of the four groups that are positioned alternately from this base point group within the image data, namely, the group "R17, Gr18, Gb27, and B28" that is located in the horizontal direction, the group "R53, Gr54, Gb63, and B64" that is located in the vertical direction and the group "R57, Gr58, Gb67, and B68" that is located in the oblique direction, and thereby generates image signals obtained by the four-pixel addition.

Specifically, the pixel adding section 111 adds the image signals of the four pixels made up of "R13" in the base point group, "R17" in the group in the horizontal direction, "R53" in the group in the vertical direction, and "R57" in the group in the oblique direction, and thereby generates the image signal of a pixel "R13'" within image data shown in FIG. 5B.

The pixel adding section 111 also adds the image signals of the four pixels made up of "Gr14" in the base point group, "Gr18" in the group in the horizontal direction, "Gr54" in the group in the vertical direction, and "Gr58" in the group in the oblique direction, and thereby generates the image signal of a pixel "Gr14'" within image data shown in FIG. 5B.

The pixel adding section 111 also adds the image signals of the four pixels made up of "Gb23" in the base point group, "Gb27" in the group in the horizontal direction, "Gb63" in the group in the vertical direction, and "Gb67" in the group in the oblique direction, and thereby generates the image signal of a pixel "Gb23'" within image data shown in FIG. 5B.

The pixel adding section 111 also adds the image signals of the four pixels made up of "B24" in the base point group, "B28" in the group in the horizontal direction, "B64" in the group in the vertical direction, and "B68" in the group in the oblique direction, and thereby generates the image signal of a pixel "B24'" within image data shown in FIG. 5B.

Figures 6A, 6B, 7A, 7B:
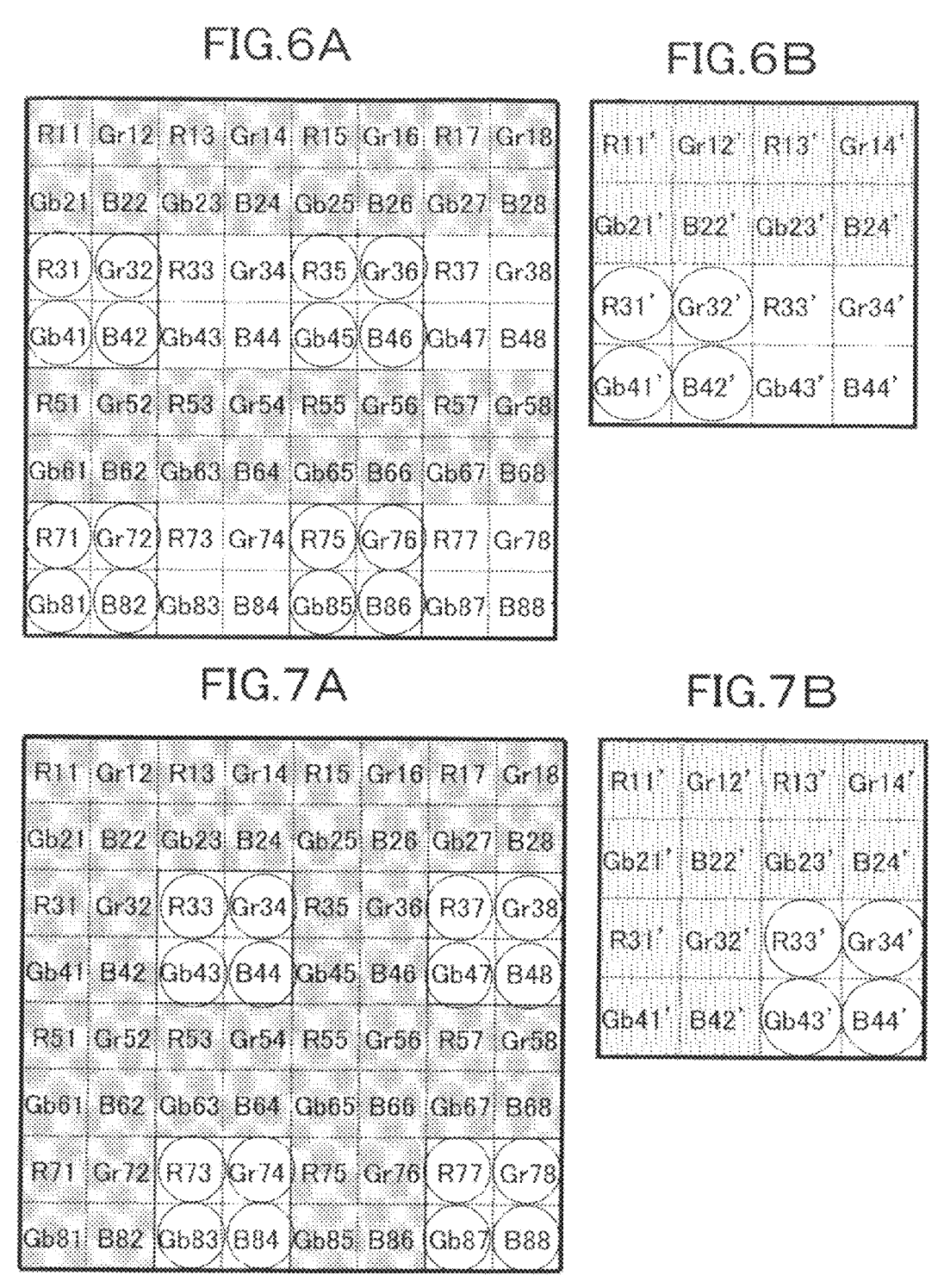

Then, the pixel adding section 111 takes the group "R31, Gr32, Gb41, and B42" shown in FIG. 6A as a base point for the pixel addition. Then, the pixel adding section 111 adds, for each type of pixels, the image signals of the pixels of the four groups that are positioned alternately from this base point group within the image data, namely, the group "R35, Gr36, Gb45, and B46" that is located in the horizontal direction, the group "R71, Gr72, Gb81, and B82" that is located in the vertical direction and the group "R75, Gr76, Gb85, and B86" that is located in the oblique direction, and thereby generates image signals obtained by the four-pixel addition.

Specifically, the pixel adding section 111 adds the image signals of the four pixels made up of "R31" in the base point group, "R35" in the group in the horizontal direction, "R71" in the group in the vertical direction, and "R75" in the group in the oblique direction, and thereby generates the image signal of a pixel "R31'" within image data shown in FIG. 6B.

The pixel adding section 111 also adds the image signals of the four pixels made up of "Gr32" in the base point group, "Gr36" in the group in the horizontal direction, "Gr72" in the group in the vertical direction, and "Gr76" in the group in the oblique direction, and thereby generates the image signal of a pixel "Gr32'" within image data shown in FIG. 6B.

The pixel adding section 111 also adds the image signals of the four pixels made up of "Gb41" in the base point group, "Gb45" in the group in the horizontal direction, "Gb81" in the group in the vertical direction, and "Gb85" in the group in the oblique direction, and thereby generates the image signal of a pixel "Gb41'" within image data shown in FIG. 6B.

The pixel adding section 111 also adds the image signals of the four pixels made up of "B42" in the base point group, "B46" in the group in the horizontal direction, "B82" in the group in the vertical direction, and "B86" in the group in the oblique direction, and thereby generates the image signal of a pixel "B42'" within image data shown in FIG. 6B.

Then, the pixel adding section 111 takes the group "R33, Gr34, Gb43, and B44" shown in FIG. 7A as a base point for the pixel addition. Then, the pixel adding section 111 adds, for each type of pixels, the image signals of the pixels of the four groups that are positioned alternately from this base point group within the image data, namely, the group "R37, Gr38, Gb47, and B48" that is located in the horizontal direction, the group "R73, Gr74, Gb83, and B84" that is located in the vertical direction and the group "R77, Gr78, Gb87, and B88" that is located in the oblique direction, and thereby generates image signals obtained by the four-pixel addition.

Specifically, the pixel adding section 111 adds the image signals of the four pixels made up of "R33" in the base point group, "R37" in the group in the horizontal direction, "R73" in the group in the vertical direction, and "R77" in the group in the oblique direction, and thereby generates the image signal of a pixel "R33'" within image data shown in FIG. 7B.

The pixel adding section 111 also adds the image signals of the four pixels made up of "Gr34" in the base point group, "Gr38" in the group in the horizontal direction, "Gr74" in the group in the vertical direction, and "Gr78" in the group in the oblique direction, and thereby generates the image signal of a pixel "Gr34'" within image data shown in FIG. 7B.

The pixel adding section 111 also adds the image signals of the four pixels made up of "Gb43" in the base point group, "Gb47" in the group in the horizontal direction, "Gb83" in the group in the vertical direction, and "Gb87" in the group in the oblique direction, and thereby generates the image signal of a pixel "Gb43'" within image data shown in FIG. 7B.

The pixel adding section 111 also adds the image signals of the four pixels made up of "B44" in the base point group, "B48" in the group in the horizontal direction, "B84" in the group in the vertical direction, and "B88" in the group in the oblique direction, and thereby generates the image signal of a pixel "B44'" within image data shown in FIG. 7B.

As described above, the pixel adding section 111 adds, for each type of pixels, the image signals of the pixels of the four groups which are positioned alternately within the image data, that is, which are positioned one group away from each other, and thereby generates image signals obtained by the four-pixel addition.

Then, the pixel adding section 111 outputs the image data generated by the pixel addition processing as an output of the solid-state imaging apparatus 101. In this case, image data made up of a total of 16 pixels, 4 pixels vertically by 4 pixels horizontally, that is, image data whose resolution is obtained by reducing the original resolution to one-fourth thereof with the four-pixel addition is output.

In step 104, the CPU 107 drives the image processing section 105 to perform various types of image processing on the image data output from the solid-state imaging apparatus 101, that is, the image data generated through the pixel addition processing performed by the pixel adding section 111.

In step 105, the CPU 107 drives the monitor 106 to display the image data after the image processing on the LCD monitor or the like.

In step 106, the CPU 107 performs compression processing on the image data resulting from the image processing, and stores the image data after the image processing in an unillustrated recording medium or the like. The compression processing is performed according to JPEG (joint photographic experts group) format or the like. When the digital camera is set in an uncompression recording mode, the CPU 107 records the uncompressed image data after the image processing in the unillustrated recording medium or the like without performing compression processing thereon.

Supplemental Description of the Embodiment

The above description deals with the case where, for example, in the image data shown in FIG. 4A, the pixel addition processing is performed while the base point is being taken in the order in which the base point is moved horizontally from the group "R11, Gr12, Gb21, and B22" to the group "R13, Gr14, Gb23, and B24" to the group "R31, Gr32, Gb41, and B42" and then to the group "R33, Gr34, Gb43, and B44."

However, the order is not limited to this. For example, the pixel addition processing may be performed while the base point is being taken in the order in which the base point is moved vertically from the group "R11, Gr12, Gb21, and B22" to the group "R31, Gr32, Gb41, and B42" to the group "R13, Gr14, Gb23, and B24" and then to the group "R33, Gr34, Gb43, and B44." Alternatively, for example, the pixel addition processing may be performed while the base point is being taken in the order in which the base point is moved obliquely from the group "R11, Gr12, Gb21, and B22" to the group "R33, Gr34, Gb43, and B44" to the group "R13, Gr14, Gb23, and B24" and then to the group "R31, Gr32, Gb41, and B42."

The above description deals with the case where the pixel adding section 111 adds, for each type of pixels, the image signals of the pixels of the four groups which are positioned alternately within the image data, that is, which are positioned one group away from each other, and thereby generates image signals obtained by the four-pixel addition. However, for example, the pixel adding section 111 may add, for each type of pixels, the image signals of the pixels of the four groups which are positioned every three groups within the image data, that is, which are positioned two groups away from each other, and thereby may generate image signals obtained by the four-pixel addition. In other words, as long as moire is reduced and the quality of an image generated by the pixel addition is not degraded, the distance ("n" groups) between the groups to be added may be one group, two groups, three groups or more.

The above description deals with the case where the pixel adding section 111 provided outside the solid-state image sensor 103 performs the pixel addition processing. However, the pixel addition may be performed within the solid-state image sensor 103. That is, when the charge is read or transferred, the pixel addition may be performed.

Figure 8:
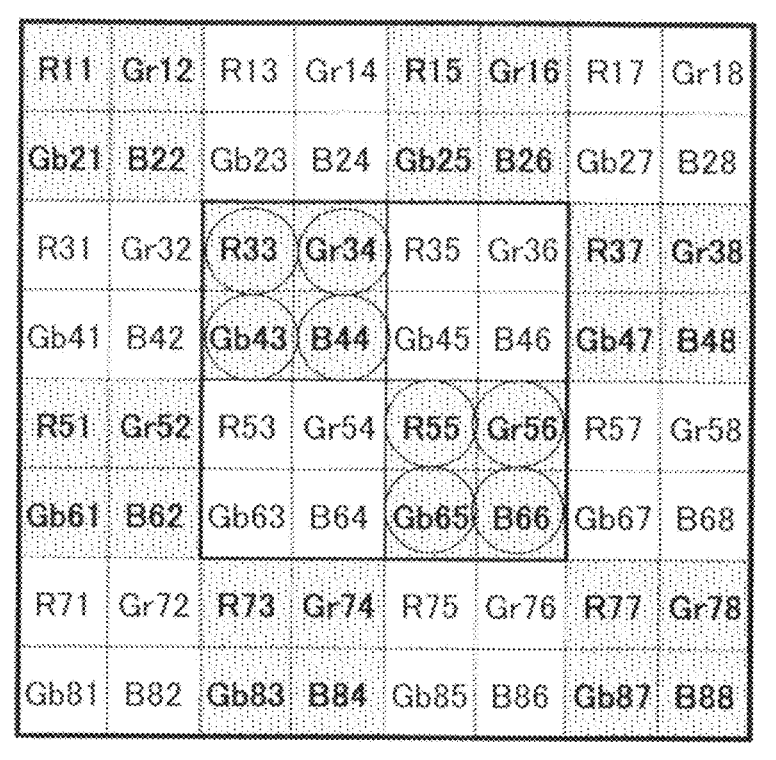

In this case, for example, a group "R11, Gr12, Gb21, and B22" on a sensor array (the light receiving surface of the solid-state image sensor 103) shown in FIG. 8 is first taken as a base point for the pixel addition. As shown in FIG. 8, on the sensor array, a light receiving element having a total of 64 pixels, 8 pixels vertically by 8 pixels horizontally, is assumed to be arranged. This is just an example, and the configuration of the pixels is not limited to this. Then, the image signals of the pixels of four groups that are this base point group and the groups positioned alternately from the base point group on the sensor array, namely, a group "R15, Gr16, Gb25, and B26" that is located in a horizontal direction, a group "R51, Gr52, Gb61, and B62" that is located in a vertical direction and a group "R55, Gr56, Gb65, and B66" that is located in an oblique direction are added for each type of pixels, and thereby image signals are generated by the four-pixel addition.

Specifically, the image signals of the four pixels made up of "R11" in the base point group, "R15" in the group in the horizontal direction, "R51" in the group in the vertical direction, and "R55" in the group in the oblique direction are read and added. Then, the image signals generated by the four-pixel addition are output as the image signals of a pixel "R33" shown in FIG. 8. Here, the original charge (image signal) stored in the pixel "R33" has not been read yet and remains held.

Then, the image signals of the four pixels made up of "Gr12" among the base point group, "Gr16" among the group in the horizontal direction, "Gr52" among the group in the vertical direction, and "Gr56" among the group in the oblique direction are read and added. Then, the image signals generated by the four-pixel addition are output as the image signals of a pixel "Gr34" shown in FIG. 8. Here, the original charge (image signal) stored in the pixel "Gr34" has not been read yet and remains held.

Then, the image signals of the four pixels made up of "Gb21" in the base point group, "Gb25" in the group in the horizontal direction, "Gb61" in the group in the vertical direction, and "Gb65" in the group in the oblique direction are read and added. Then, the image signals generated by the four-pixel addition are output as the image signals of a pixel "Gb43" shown in FIG. 8. Here, the original charge (image signal) stored in the pixel "Gb43" has not been read yet and remains held.

Then, the image signals of the four pixels made up of "B22" in the base point group, "B26" in the group in the horizontal direction, "B62" in the group in the vertical direction, and "B66" in the group in the oblique direction are read and added. Then, the image signals generated by the four-pixel addition are output as the image signals of a pixel "B44" shown in FIG. 8. Here, the original charge (image signal) stored in the pixel "B44" has not been read yet and remains held.

Then, for example, a group "R33, Gr34, Gb43, and B44" on the sensor array shown in FIG. 8 is taken as the base point for the pixel addition.

Then, the image signals of the pixels of four groups that are this base point group and the groups positioned alternately from the base point group on the sensor array, namely, a group "R37, Gr38, Gb47, and B48" that is located in the horizontal direction, a group "R73, Gr74, Gb83, and B84" that is located in the vertical direction and a group "R77, Gr78, Gb87, and B88" that is located in the oblique direction are added for each type of pixels, and thereby image signals are generated by the four-pixel addition.

Specifically, the image signals of the four pixels made up of "R33" in the base point group, "R37" in the group in the horizontal direction, "R73" in the group in the vertical direction, and "R77" in the group in the oblique direction are read and added. The image signal of the pixel "R33" is read at this point. Then, the image signals generated by the four-pixel addition are output as the image signals of a pixel "R55" shown in FIG. 8.

Then, the image signals of the four pixels made up of "Gr34" in the base point group, "Gr38" in the group in the horizontal direction, "Gr74" in the group in the vertical direction, and "Gr78" in the group in the oblique direction are read and added. The image signal of the pixel "Gr34" is read at this point. Then, the image signals generated by the four-pixel addition are output as the image signals of a pixel "Gr56" shown in FIG. 8.

Then, the image signals of the four pixels made up of "Gb43" in the base point group, "Gb47" in the group in the horizontal direction, "Gb83" in the group in the vertical direction, and "Gb87" in the group in the oblique direction are read and added. The image signal of the pixel "Gb43" is read at this point. Then, the image signals generated by the four-pixel addition are output as the image signals of a pixel "Gb65" shown in FIG. 8.

Then, the image signals of the four pixels made up of "B44" in the base point group, "B48" in the group in the horizontal direction, "B84" in the group in the vertical direction, and "B88" in the group in the oblique direction are read and added. The image signal of the pixel "B44" is read at this point. Then, the image signals generated by the four-pixel addition are output as the image signals of a pixel "B66" shown in FIG. 8.

Thereafter, in the same manner as described above, the image signals of the pixels of four groups, namely, a group "R13, Gr14, Gb23, and B24" that is set as the base point, a group "R17, Gr18, Gb27, and B28" (in the horizontal direction), a group "R53, Gr54, Gb63, and B64" (in the vertical direction) and a group "R57, Gr58, Gb67, and B68" (in the oblique direction) are read, and are added for each type of pixels (four-pixel addition). Then, the image signals for each type of pixels generated by the four-pixel addition are output as the image signals of pixels "R35", "Gr36", "Gb45", and "B46" shown in FIG. 8. Here, the original charges (image signals) stored in the pixels "R35", "Gr36", "Gb45", and "B46" have not been read yet and remain held.

Then, continuously in the same manner as described above, the image signals of the pixels of four groups, namely, a group "R31, Gr32, Gb41, and B42" that is set as the base point, a group "R35, Gr36, Gb45, and B46" (in the horizontal direction), a group "R71, Gr72, Gb81, and B82" (in the vertical direction) and a group "R75, Gr76, Gb85, and B86" (in the oblique direction) are read, and added for each type of pixels (four-pixel addition). The image signals of the pixels "R35", "Gr36", "Gb45", and "B46" are read at this point. Then, the image signals for each type of pixels generated by the four-pixel addition are output as the image signals of the pixels "R53", "Gr54", "Gb63", and "B64" shown in FIG. 8.

As a result of this pixel addition, an analog image signal made up of a total of 16 pixels, 4 pixels vertically by 4 pixels horizontally, is output from the solid-state image sensor 103.

As described above, the pixel addition is preferably performed within the solid-state image sensor 103. Here, the pixel addition is performed while the base point is being taken in the order in which the base point is moved obliquely; however, the order is not limited to this. The pixel addition may be performed while the base point is being taken either in the order in which the base point is moved horizontally or in the order in which the base point is moved vertically.

Beneficial Effects of the Embodiment

As described above, in the digital camera of the present embodiment, either on the sensor array or within the image data, for example, the image signals of the pixels of the four groups which are positioned alternately, that is, which are positioned one group away from each other are added for each type of pixels, and thereby the image signals are generated by the four-pixel addition.

In the example of FIG. 4A, the image signals of the pixels of the four groups that are positioned alternately from each other within the image data of FIG. 4A, namely, the base point group "R11, Gr12, Gb21, and B22", the group "R15, Gr16, Gb25, and B26" in the horizontal direction, the group "R51, Gr52, Gb61, and B62" in the vertical direction and the group "R55, Gr56, Gb65, and B66" in the oblique direction are added for each type of pixels.

In this case, the pixels that are added and that have the same color are not adjacent to each other, and their groups are positioned one group away from each other in all the vertical, horizontal and oblique directions.

Hence, the image signals generated by the pixel addition have an appropriate level of blurring effects.

Thus, with the digital camera of the present embodiment, it is possible to reduce moire produced by the pixel addition. In particular, the digital camera of the present embodiment has the effect of reducing color moire.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A digital camera comprising:
    an image sensor, the image sensor being arranged with:
        i) in order of a first light receiving element, a second light receiving element, a third light receiving element and a fourth light receiving element along a first direction, in which the first light receiving element outputs a first signal corresponding to light made incident through a first filter having a first spectral characteristic, the second light receiving element outputs a second signal corresponding to light made incident through a second filter having the first spectral characteristic, the third light receiving element outputs a third signal corresponding to light made incident through a third filter having the first spectral characteristic, and the fourth light receiving element outputs a fourth signal corresponding to light made incident through a fourth filter having the first spectral characteristic;
        ii) in order of the first light receiving element, a fifth light receiving element, and a six light receiving element along a second direction perpendicular to the first direction, in which the fifth light receiving element outputs a fifth signal corresponding to light made incident through a fifth filter having the first spectral characteristic and the sixth light receiving element outputs a sixth signal corresponding to light made incident through a sixth filter having the first spectral characteristic, and
        iii) in order of the second light receiving element, a seventh light receiving element, and an eighth light receiving element along the second direction, in which the seventh light receiving element outputs a seventh signal corresponding to light made incident through a seventh filter having the first spectral characteristic and the eighth light receiving element outputs a eighth signal corresponding to light made incident through an eighth filter having the first spectral characteristic;
    an adding unit inputting the first signal, the second signal, the third signal, the fourth signal, the fifth signal, the sixth signal, the seventh signal and the eighth signal, and generating i) a first addition signal by adding the first signal, the third signal and the sixth signal, and ii) a second addition signal by adding the second signal, the fourth signal and the eighth signal, and
    a displaying unit displaying an image generated by the first addition signal and the second addition signal obtained by the adding unit.

2. The digital camera according to claim 1, wherein the image sensor is arranged with in order of the third light receiving element, a ninth light receiving element and a tenth light receiving element along the second direction, in which the ninth light receiving element outputs a ninth signal corresponding to light made incident through a ninth filter having the first spectral characteristic and the tenth light receiving element outputs a tenth signal corresponding to light made incident through a tenth filter having the first spectral characteristic, and arranged with in order of the fourth light receiving element, an eleventh light receiving element and a twelfth light receiving element along the second direction, in which the eleventh light receiving element outputs an eleventh signal corresponding to light made incident through an eleventh filter having the first spectral characteristic and the twelfth light receiving element outputs a twelfth signal corresponding to light made incident through a twelfth filter having the first spectral characteristic; and
    the adding unit inputs the ninth signal, the tenth signal, the eleventh signal and the twelfth signal, and generates 1) the first addition signal by adding the first signal, the third signal, the sixth signal and the tenth signal, and ii) the second addition signal by adding the second signal, the fourth signal, the eighth signal and the twelfth signal.

3. A pixel adding method of a digital camera, the pixel adding method comprising:
    arranging an image sensor with:
        i) in order of a first light receiving element, a second light receiving element, a third light receiving element and a fourth light receiving element along a first direction, in which the first light receiving element outputs a first signal corresponding to light made incident through a first filter having a first spectral characteristic, the second light receiving element outputs a second signal corresponding to light made incident through a second filter having the first spectral characteristic, the third light receiving element outputs a third signal corresponding to light made incident through a third filter having the first spectral characteristic, and the fourth light receiving element outputs a fourth signal corresponding to light made incident through a fourth filter having the first spectral characteristic;
        ii) in order of the first light receiving element, a fifth light receiving element, and a six light receiving element along a second direction perpendicular to the first direction, in which the fifth light receiving element outputs a fifth signal corresponding to light made incident through a fifth filter having the first spectral characteristic and the sixth light receiving element outputs a sixth signal corresponding to light made incident through a sixth filter having the first spectral characteristic, and
        iii) in order of the second light receiving element, a seventh light receiving element, and an eighth light receiving element along the second direction, in which the seventh light receiving element outputs a seventh signal corresponding to light made incident through a seventh filter having the first spectral characteristic and the eighth light receiving element outputs an eighth signal corresponding to light made incident through an eighth filter having the first spectral characteristic;
    inputting the first signal, the second signal, the third signal, the fourth signal, the fifth signal, the sixth signal, the seventh signal and the eighth signal, the step being performed by an adding unit;
    generating i) a first addition signal by adding the first signal, the third signal, and the sixth signal, and ii) a second addition signal by adding the second signal, the fourth signal and the eighth signal, the step being performed by the adding unit; and
    displaying an image generated by the first addition signal and the second addition signal obtained by the adding unit, the step being performed by a display unit.

4. The pixel adding method according to claim 3, further comprises:
    arranging the image sensor with in order of the third light receiving element, a ninth light receiving element and a tenth light receiving element along the second direction, in which the ninth light receiving element outputs a ninth signal corresponding to light made incident through a ninth filter having the first spectral characteristic and the tenth light receiving element outputs a tenth signal corresponding to light made incident through a tenth filter having the first spectral characteristic, and arranging the image sensor with in order of the fourth light receiving element, an eleventh light receiving element and a twelfth light receiving element along the second direction, in which the eleventh light receiving element outputs an eleventh signal corresponding to light made incident through an eleventh filter having the first spectral characteristic and the twelfth light receiving element outputs a twelfth signal corresponding to light made incident through a twelfth filter having the first spectral characteristic; and inputting the ninth signal, the tenth signal, the eleventh signal and the twelfth signal, and generating i) the first addition signal by adding the first signal, the third signal, the sixth signal and the tenth signal, and ii) the second addition signal by adding the second signal, the fourth signal, the eighth signal and the twelfth signal, the step being performed by the adding unit.

* * * * *